US011929964B2

(12) United States Patent
Goenka et al.

(10) Patent No.: US 11,929,964 B2
(45) Date of Patent: Mar. 12, 2024

(54) COMPUTERIZED SYSTEM AND METHOD FOR PROVIDING AN AUGMENTED MESSAGE CONTENT DISPLAY

(71) Applicant: YAHOO AD TECH LLC, Dulles, VA (US)

(72) Inventors: Mohit Goenka, Santa Clara, CA (US); Gnanavel Shanmugam, San Jose, CA (US); Ashish Khushal Dharamshi, Sunnyvale, CA (US); Nikita Varma, Milpitas, CA (US)

(73) Assignee: YAHOO AD TECH LLC, New York, NY (US)

( * ) Notice: Subject to any disclaimer, the term of this patent is extended or adjusted under 35 U.S.C. 154(b) by 0 days.

(21) Appl. No.: 17/406,146

(22) Filed: Aug. 19, 2021

(65) Prior Publication Data

US 2023/0058471 A1    Feb. 23, 2023

(51) Int. Cl.
*H04L 51/02* (2022.01)
*G06F 3/0484* (2022.01)
*G06F 16/955* (2019.01)
*H04L 51/08* (2022.01)
*G06F 40/30* (2020.01)

(52) U.S. Cl.
CPC ............ *H04L 51/02* (2013.01); *G06F 3/0484* (2013.01); *G06F 16/955* (2019.01); *H04L 51/08* (2013.01); *G06F 40/30* (2020.01)

(58) Field of Classification Search
CPC ....... H04L 51/02; H04L 51/08; G06F 3/0484; G06F 16/955; G06F 40/30
See application file for complete search history.

(56) References Cited

U.S. PATENT DOCUMENTS

| 2013/0151633 | A1* | 6/2013 | Hazarika | H04L 51/52 |
| | | | | 709/206 |
| 2013/0232014 | A1* | 9/2013 | Judd | G06Q 30/0277 |
| | | | | 705/14.73 |
| 2015/0295874 | A1* | 10/2015 | Virtanen | H04L 51/214 |
| | | | | 709/206 |
| 2016/0248719 | A1* | 8/2016 | Acharyya | G06F 40/30 |
| 2020/0374247 | A1* | 11/2020 | Beeman | H04L 67/02 |
| 2021/0036977 | A1* | 2/2021 | Everton | H04L 51/212 |

* cited by examiner

*Primary Examiner* — Austin J Moreau
(74) *Attorney, Agent, or Firm* — James J. DeCarlo; Greenberg Traurig, LLP

(57) ABSTRACT

The disclosed systems and methods provide a novel framework that provides mechanisms for enabling message senders to dictate, control and/or create dynamic immersive content consumption experiences for recipients of their messages. The disclosed framework provides message senders with previously non-existent functionality to control the experience and environment within which their messages are consumed. Conventional systems provide recipients with capabilities to consume messages and/or supplemental content; however, these capabilities are driven and controlled by the hosting messaging platform and/or the third party entity that is availed opportunities to provide supplemental content. The disclosed framework prevents such experiences by providing capabilities to the message sender that involves control not only over the experience of the sender's messages but also control over the experience of the environment in which the messages are consumed by their recipients.

20 Claims, 4 Drawing Sheets

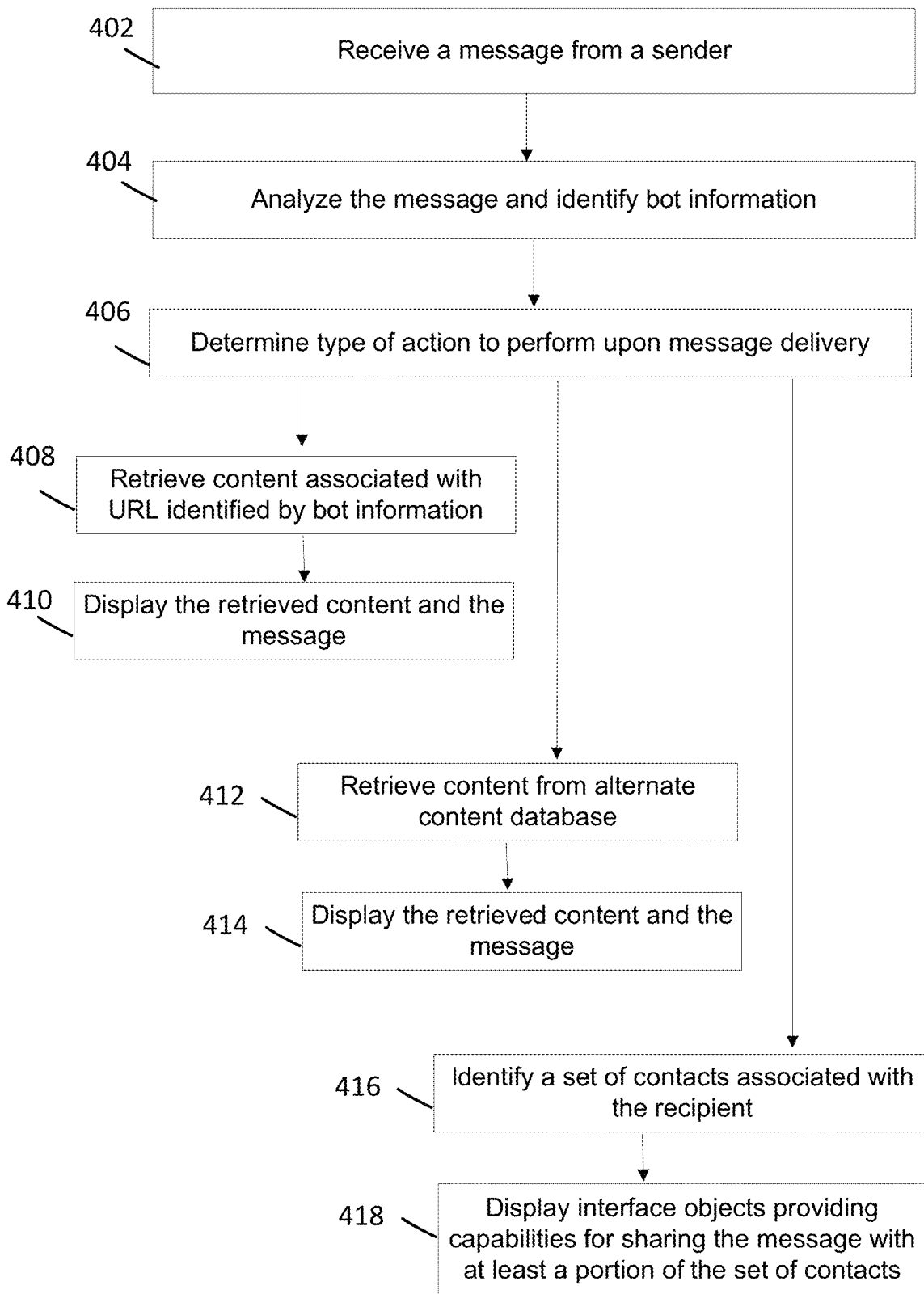

COMPUTERIZED SYSTEM AND METHOD FOR PROVIDING AN AUGMENTED MESSAGE CONTENT DISPLAY

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates to providing senders of messages with functionality for controlling how message recipients receive and/or are capable of consuming their messages and/or supplemental content related to their messages.

BACKGROUND

Current messaging platforms, such as electronic mail ("e-mail" or "email", used interchangeably), are capable of providing recipient users with avenues to receive supplemental content related to the messages they are receiving. However, existing mechanisms by which the messages and the supplemental content are provided to recipients are dictated by the messaging platform that decides how/when third party content is made available to the user.

SUMMARY

The present disclosure provides a framework that provides novel mechanisms for enabling message senders (i.e., sending users) to dictate, control and/or create dynamic immersive content for recipients (e.g., recipient users) of their messages. The disclosed framework provides systems and methods that provide message senders with previously non-existent functionality to control the environment within which their messages are consumed.

Conventional systems provide recipients with capabilities to consume messages and/or supplemental content; however, these capabilities are driven and controlled by the hosting messaging platform and/or, in part, by third party entities that are given opportunities to provide supplemental content (e.g., ads). This can reduce a recipient user's experience with a message platform and can lead to wasted computational resources that result from platform abandonment. Mixed messaging as well as user confusion can also be caused when control of messages is passed on to other parties that are not the sender. For example, a user may receive a message about a widget from vendor X, and other content displayed for a similar widget from vendor Y. This can distract the user from the original message, and/or can drive the user's experience in an undesired direction.

The disclosed framework provides a technical solution that provides capabilities to the message sender that grants them control not only over their messages, but also control over the environment in which the messages are consumed by the recipients. This allows for increased user satisfaction which maximizes the utilization of computational and network resources by avoiding wasted messages, as well as enables the sender to use expanded capabilities to encourage the recipient to share the message with other users they frequently communicate with.

According to some embodiments, while the discussion herein will focus on messages communicated on and/or over a messaging platform, for example email messages via an email platform, it should be understood that any other type or form of known or to be known electronic messages or content, and/or platforms (or messaging applications) can be utilized without departing from the scope of the instant disclosure. Thus, the disclosed framework can be used when users are viewing and/or interacting with any type of content on a network, such as for example, but not limited to, messages, web pages, articles, application pages, social media posts, and the like, or some combination thereof.

In accordance with one or more embodiments, the present disclosure provides computerized methods for a novel framework that provides senders of messages with functionality for controlling how message recipients receive and/or are capable of consuming messages and supplemental content related to the messages.

In accordance with one or more embodiments, the present disclosure provides a non-transitory computer-readable storage medium for carrying out the above mentioned technical steps of the framework's functionality. The non-transitory computer-readable storage medium has tangibly stored thereon, or tangibly encoded thereon, computer readable instructions that when executed by a device (e.g., application server, messaging server, ad server, content server and/or client device, and the like) cause at least one processor to perform a method for a novel and improved framework that provides senders of messages with functionality for controlling how message recipients receive and/or are capable of consuming messages and supplemental content related to the messages.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 4 is a block diagram illustrating an exemplary data flow in accordance with some embodiments of the present disclosure.

DESCRIPTION OF EMBODIMENTS

Figure 1:
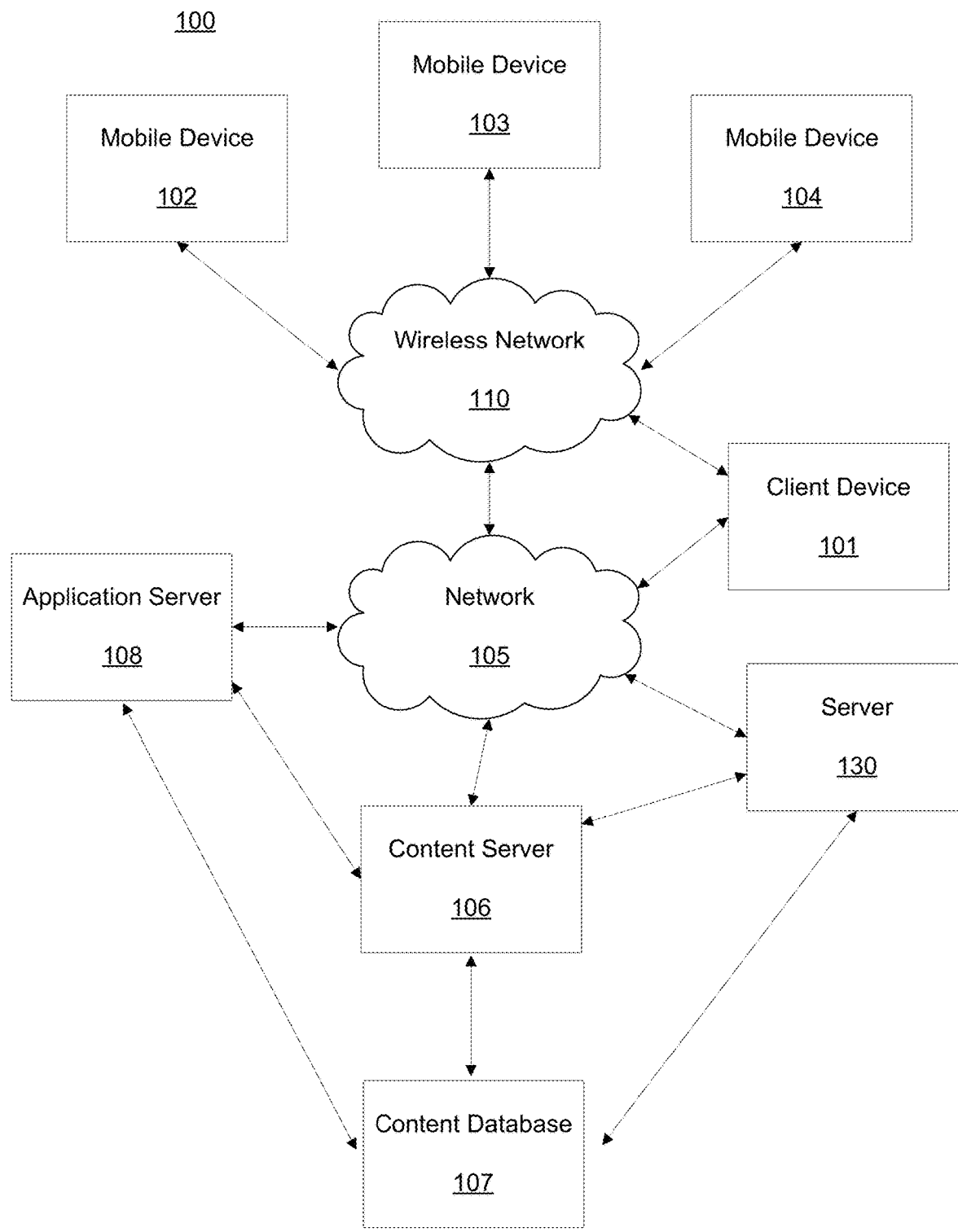
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

As discussed herein, reference to an "advertisement" should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item comprises content relaying promotional content provided by a network associated party.

As discussed in more detail below, according to some embodiments, information associated with, derived from, or otherwise identified from, during or as a result of a message delivery and/or created message experience, as discussed herein, can be used for monetization purposes and targeted advertising when providing, delivering or enabling such devices access to content or services over a network. Providing targeted advertising to users associated with such discovered content can lead to an increased click-through rate (CTR) of such ads and/or an increase in the advertiser's ROI for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108 and third party server 130.

One embodiment of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above.

Mobile devices 102-104 also may include at least one client application that is configured to receive content from another computing device. In some embodiments, mobile devices 102-104 may also communicate with non-mobile client devices, such as client device 101, or the like. In one embodiment, such communications may include sending and/or receiving messages, searching for, viewing and/or sharing memes, photographs, digital images, audio clips, video clips, or any of a variety of other forms of communications.

Client devices 101-104 may be capable of sending or receiving signals, such as via a wired or wireless network, or may be capable of processing or storing signals, such as in memory as physical memory states, and may, therefore, operate as a server.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

Network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

The content server 106 may include a device that includes a configuration to provide any type or form of content via a network to another device. Devices that may operate as content server 106 include personal computers, desktop computers, multiprocessor systems, microprocessor-based or programmable consumer electronics, network PCs, servers, and the like. Content server 106 can further provide a variety of services that include, but are not limited to, email services, instant messaging (IM) services, streaming and/or downloading media services, advertising services, search services, photo services, web services, social networking services, news services, third-party services, audio services, video services, SMS services, MMS services, FTP services, voice over IP (VOIP) services, or the like.

Third party server 130 can comprise a server that stores online advertisements for presentation to users. In some embodiments, various monetization techniques or models may be used in connection with sponsored advertising, including advertising associated with user data, as discussed below, where ads can be modified and/or added to content based on information related to the recipient user(s), the content included in the messages, and/or information related to and/or provided by the message sender.

In some embodiments, users are able to access services provided by servers 106, 108 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104.

In some embodiments, applications, such as, but not limited to, mail applications (e.g., Yahoo! Mail®, Gmail®, and the like), instant messaging applications, blog, photo or social networking applications (e.g., Facebook®, Twitter®, Instagram®, and the like), search applications (e.g., Yahoo!® Search), news applications (e.g., Yahoo! Sports®, ESPN®, Huffington Post®, CNN®, and the like), and the like, can be hosted by the application server 108, or content server 106 and the like.

Thus, the application server 108, for example, can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below (e.g. database 320 of FIG. 3). Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108 and/or 130.

Moreover, although FIG. 1 illustrates servers 106, 108 and 130 as single computing devices, respectively, the disclosure is not so limited. For example, one or more functions of servers 106, 108 and/or 130 may be distributed across one or more distinct computing devices. Moreover, in one embodiment, servers 106, 108 and/or 130 may be integrated into a single computing device, without departing from the scope of the present disclosure.

Figure 2:
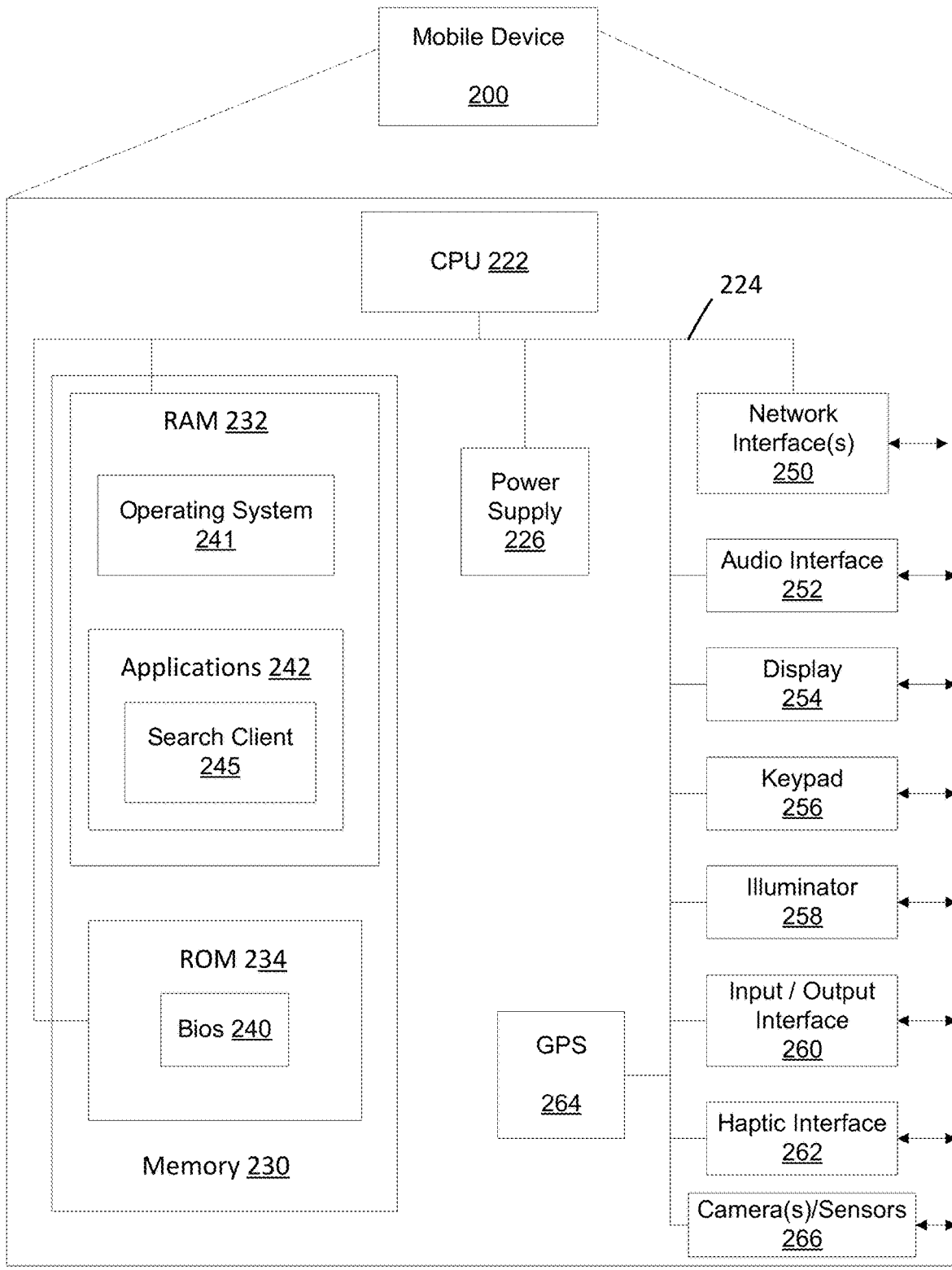
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. Power supply 226 provides power to Client device 200.

Client device 200 may optionally communicate with a base station (not shown), or directly with another computing device. Network interface 250 is sometimes known as a transceiver, transceiving device, or network interface card (NIC).

Audio interface 252 can be arranged to produce and receive audio signals such as, for example, the sound of a human voice. Display 254 can, but is not limited to, a include a touch sensitive screen arranged to receive input from an object such as a stylus or a digit from a human hand. Keypad 256 can comprise any input device arranged to receive input from a user. Illuminator 258 may provide a status indication and/or provide light.

Client device 200 also comprises input/output interface 260 for communicating with external devices. Input/output interface 260 can utilize one or more communication technologies, such as USB, infrared, Bluetooth™, or the like. Haptic interface 262 is arranged to provide tactile feedback to a user of the client device.

Optional GPS transceiver 264 can determine the physical coordinates of Client device 200 on the surface of the Earth. In some embodiments however, Client device 200 may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 stores a basic input/output system ("BIOS") 240 for controlling low-level operation of Client device 200. The mass memory also stores an operating system 241 for controlling the operation of Client device 200

Memory 230 further includes one or more data stores, which can be utilized by Client device 200 to store, among other things, applications 242 and/or other information or data. For example, data stores may be employed to store information that describes various capabilities of Client device 200. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Applications 242 may further include search client 245 that is configured to send, to receive, and/or to otherwise process a search query and/or search result.

Having described the components of the general architecture employed within the disclosed systems and methods, the components' general operation with respect to the disclosed systems and methods will now be described below.

Figure 3:
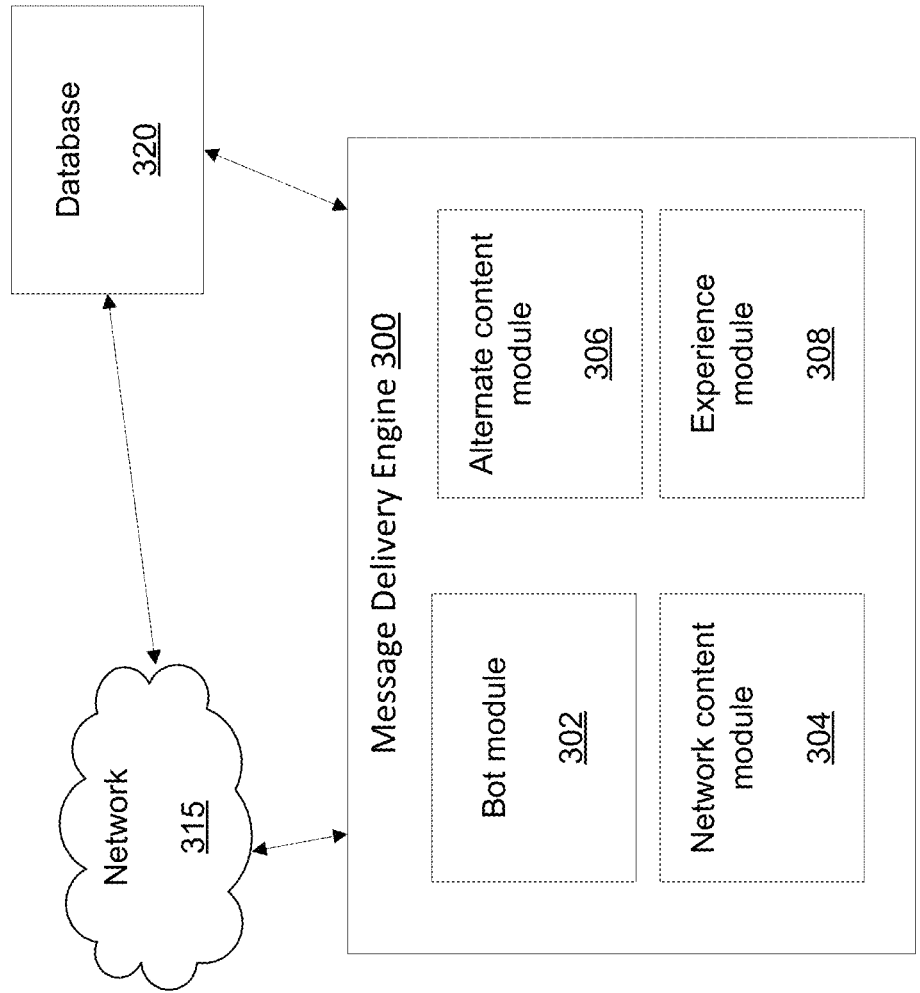
FIG. 3 is a block diagram illustrating components of an exemplary system in accordance with embodiments of the present disclosure.

FIG. 3 is a block diagram illustrating the components for performing the systems and methods discussed herein. FIG. 3 includes message delivery engine 300, network 315 and database 320. The message delivery engine 300 can be a special purpose machine or processor and could be hosted by a network server (e.g., messaging server, cloud web services server(s)), application server, content server, social networking server, web server, search server, content provider, third party server, user's computing device, and the like, or any combination thereof.

According to some embodiments, message delivery engine 300 can be embodied as a stand-alone application that executes on a networking server. In some embodiments, the message delivery engine 300 can function as an application installed on the user's device, and in some embodiments, such application can be a web-based application accessed by the user device over a network. In some embodiments, the message delivery engine 300 can be configured and/or installed as an augmenting script, program or application (e.g., a plug-in or extension) to another application or portal data structure.

The database 320 can be any type of database or memory, and can be associated with a content server on a network (e.g., content server, a search server or application server) or a user's device (e.g., device 101-104 or device 200 from FIGS. 1-2). Database 320 comprises a dataset of data and metadata associated with local and/or network information related to users, services, applications, content and the like.

In some embodiments, such information can be stored and indexed in the database 320 independently and/or as a linked or associated dataset. An example of this is look-up table (LUT). As discussed above, it should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user patterns, user attributes, user preferences or settings, user demographic information, user location information, user biographic information, and the like, or some combination thereof.

In some embodiments, the user data can also include user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store data and metadata associated with users, searches, actions, clicks, conversions, recommendations, messages, images, videos, text, products, items and services from an assortment of media, applications and/or service providers and/or platforms, and the like. Accordingly, any other type of known or to be known attribute or feature associated with a user, message, data item, media item, login, logout, website, application, communication (e.g., a message) and/or its transmission over a network, a user and/or content included therein, or some combination thereof, can be saved as part of the data/metadata in datastore 320.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the message delivery engine 300, and the database of stored resources 320. Indeed, as illustrated in FIG. 3, the message delivery engine 300 and database 320 can be directly connected by any known or to be known method of connecting and/or enabling communication between such devices and resources.

The principal processor, server, or combination of devices that comprise hardware programmed in accordance with the special purpose functions herein is referred to for convenience as message delivery engine 300, and includes bot module 302, network content module 304, alternate content module 306 and experience module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Turning to FIG. 4, Process 400 is disclosed which details non-limiting example embodiments of the disclosed systems and methods. According to some embodiments, Process 400 provides mechanisms where a sender can leverage a bot (or similar type of software application) while sending a message to a recipient, where the type of bot used (or instructions provided by the bot) can dictate how the message can be consumed by the recipient and/or the recipient's experience while consuming the message.

According to some embodiments, as discussed in more detail below, based on the bot being used by the sender via the message, engine 300 can perform various types of actions or operations (used interchangeably), such as: i) provide supplemental, network-located content (e.g., Steps 408-410, as discussed below), ii) provide access to uploaded, alternate content stored in an associated alternate content database (e.g., Steps 412-414, as discussed below), and/or iii) create and provide an interactive, adaptive user interface (UI) or displayable UI portion that depicts interface objects related to the message content and/or enables the recipient to share the message with the recipient's contacts (e.g., Steps 416-418, as discussed below).

In some embodiments, engine 300 can perform one of actions i-iii, and/or a combination of these actions so as to provide a fully immersive experience for a user. In some embodiments, the type and/or quantity of actions can be dictated by the bot information included in the message. For example, if Apple® sends a message to a recipient related to the latest iPhone®, when the recipient opens the message, an advertisement for downloadable applications can be displayed (e.g., Steps 408-410), a skin can be downloaded and displayed in the background of the window displaying the message (e.g., Steps 412-414), and a pop-up window can be displayed providing functionality for sharing the message (and/or advertisement) with other users (e.g., Steps 416-418).

In some embodiments, only a portion or one of these actions can be provided by engine 300, as dictated by the bot information included and/or associated with the message, as discussed below. In some embodiments, the bot information can reference a single bot and/or multiple bots, where each bot can have its own separate functionality.

Thus, as discussed below, according to some embodiments, when commercial or marketing emails are sent from commercial entities to recipients, the entities can control how their content is consumed by the recipient. While the discussion herein will be based on sending commercial emails from commercial entities (e.g., vendors) to recipient users (e.g., marketing emails, for example), it should be construed as limiting, as other types of emails, whether machine generated or user generated, can be communicated and managed by any type of sender, whether a commercial or personal user, without departing from the scope of the instant disclosure.

According to some embodiments, Steps 402-406 of Process 400 can be performed by bot module 302 of message delivery engine 300; Steps 408-410 can be performed by network content module 304; Steps 412-414 can be performed by alternate content module 306; Steps 416-418 can be performed by experience module 308.

Process 400 begins with Step 402 where a message from a sender can be received. The message can be addressed to a recipient(s), and can include content, which can include, but is not limited to, text, images, Uniform Resource Locators (URLs), videos, videos, multimedia content and/or any other type of known or to be known digitally renderable content that can be displayed within a UI or window that is displaying a message.

According to embodiments of the instant disclosure, the received message of Step 402 further includes and/or references bot information. Bot information corresponds to the bot the sender is using to control the message upon delivery and/or interaction by the recipient (e.g., when the message is delivered to the recipient's inbox and/or when the recipient opens the message). In some embodiments, the bot information can include, but is not limited to, bot embedded code within the message, a bot address (e.g., an associated IP address of the bot), and/or other information related to a bot software application that identifies a type of bot and indicates functionality to be executed on the device of the recipient, as discussed below.

In some embodiments, the bot information can be embedded into the message, included in or referenced by the message header, included in or referenced by the message body, appended to the message as an attachment or augmented script to be executed upon delivery and/or interaction, and the like.

In Step 404, upon receiving the message from the sender (and prior to delivery to the recipient), engine 300 can analyze the message and identify the bot information. In some embodiments, engine 300 can utilize any type of computational analysis and/or mining technique or algorithm to parse the message and identify the bot information included therein. For example, engine 300 can utilize a neural network algorithm, parser, entropy algorithm, and/or any other type of algorithm or computerized mechanism to parse a message and identify (or extract) bot information therefrom.

In Step 406, engine 300 determines a type of action (or operation) to perform based on the bot information. In some embodiments, Step 406 is performed prior to delivery of the message to an inbox of the recipient. In some embodiments, the determination can be based on the computational analysis techniques used to identify the bot information from Step 404.

In some embodiments, the determination can indicate whether to retrieve content from a network location (e.g., Steps 408-410, discussed below), retrieve alternate content from an associated alternate content database (e.g., Steps 412-414, discussed below), and/or enable sharing of the message (and/or its associated content, such as the advertisement from Steps 408-410) (e.g., Steps 416-418, as discussed below).

In some embodiments, the determination can further indicate when to perform the actions. In some embodiments, the bot information can indicate a timing of when to perform an action. In some embodiments, such timing can be associated with delivery of the message (e.g., when the message is populated in the recipient's inbox). In some embodiments, the timing can be associated with the recipient opening the message. In some embodiments, a particular type of action can be performed upon delivery and another can be performed upon opening of the message.

In some embodiments, Step 406 can include determining the type of action(s) and a timing of when to perform the action(s), then delivering the message to the recipient and monitoring for activity by the recipient related to the message according to the timing. Thus, in some embodiments, Steps 408, 412 and/or 416 are performed (and their subsequent steps) according to the timing of the action. That is, in some embodiments, these steps can be performed when the recipient opens the message, and in some embodiments, they can be performed when the message is delivered to the recipient's inbox.

In some embodiments, Process 400 can proceed to Step 408 when engine 300 determines in Step 406 that the bot information identifies a network address corresponding to supplemental content. In some embodiments, the supplemental content can be any type of digitally renderable content, and can be identifiable via a URL included and/or embedded in a portion of the message as part of the bot information.

In Step 408, engine 300 identifies the URL, navigates to that networked resource, and retrieves the content located at that network location. Then, in Step 410, engine 300 generates a display of the retrieved content. The generated display can be within another window, interface or UI portion, as an overlay of the message window, in the background of the message window, in a sidebar, on a display of a paired device or other Internet of Things (IoT) connected device, as an augmented reality (AR) or virtual reality (VR) display, and the like, or some combination thereof.

By way of a non-limiting example, vendor X sends a message with bot information referenced in the message's header that references a URL. Upon the recipient opening the message, engine 300 can retrieve the content from the URL and display the retrieved content within an adjacent window to the message. This, therefore, enables the sender, here vendor X, to control which type and form of supplemental content is being displayed along with their message.

In some embodiments, Process 400 can proceed to Step 412 when engine 300 determines in Step 406 that the bot information includes instructions to retrieve alternate content that has been uploaded by the sender to an associated alternate content database. In some embodiments, the instructions can include a resource identifier (ID) for purposes of identifying the content within the database. The alternate content can be any type of digital content, such as, but not limited to, images, text, video, skins, and/or any other type of media or multi-media renderable by a device and/or displayable within a UI, and may be sponsored or unsponsored.

In Step 412, engine 300 searches for and retrieves the content referenced by the bot information of the message from the alternate content database. Then, in Step 414, in a similar manner as discussed above in relation to Step 410, the retrieved content can be displayed.

Thus, in Steps 412-414, engine 300 enables senders to take advantage of network capabilities of current user devices, such as 5G compatibility, by offloading content to an alternate content database (rather than sending it as part of the message), and causing the recipient's device to request and retrieve the content upon opening the message. This, among other technical advantages, can lead to reduced processing and resource usage by the handling server as the content being referenced is offloaded to another location that the recipient's client device locate and retrieve through an expenditure of its own resources (e.g., the client devices must expend processing capabilities to access the content, rather than the server expending the resources to provide the content).

By way of a non-limiting example, vendor X sends a message to a user about their recent purchase of a widget. The message includes bot information that references a video explaining how to construct and use the widget. Upon the recipient opening the message, the video is retrieved and can be auto-rendered in an adjacent window to the message's window.

In some embodiments, Process 400 can proceed to Step 416 when engine 300 determines in Step 406 that the bot information includes instructions for enabling the recipient to share the message. These instructions can be used in order to "nudge" the recipient to share the message in an effort to leverage the recipient's network to provide viral campaigning for the sender. In some embodiments, the instructions can comprise code, program logic and/or other executable objects (e.g., scripts) that can cause an interface object and/or UI to be displayed for sharing the message with other users.

In Step 416, engine 300 analyzes contact information for the user, and identifies a set of contacts. In some embodiments, the set of contacts can be identified based on a criteria associated with, but not limited to, context of the message (e.g., context of the message content included in the message), interests of the contacts (e.g., from profile information of each contact), frequency of interaction with the recipient, recency of interaction with the recipient, demographics of the contacts, geographical information of the contacts, and the like, or some combination thereof. In some embodiments, a number of the contacts in the set can be based on a threshold so that only a top n number of contacts are identified.

For example, if user Bob receives an email about a widget, and his top 3 contacts are his two friends and his 15 year old son, while the son is a top contact, he may not be interested in widgets at this point in his life (but the two friends are interested based on their profile information); therefore, his son could be excluded from the identified contacts.

In Step 418, engine 300 can then provide an interactive display that enables the recipient to share the message with the identified contacts. In some embodiments, Step 418 can involve a "share" button or interactive interface object(s) being displayed within, adjacent to and/or in association with the message. In some embodiments, the object/button of Step 418 can act as a "create message" button within an inbox that enables messages to be composed, addressed and sent to those identified contacts, where in some embodiments, the messages can be formatted as "forwarded" messages and in some embodiments, can be created as "new" messages that include at least a portion of the original message's content.

According to some embodiments, engine 300 can track the shares of the message and charge the message sender based on a variety of factors, such as, but not limited to, open rate, CTR, conversion rate, share rate, and the like.

In some embodiments, as discussed above, Process 400 can operate for other types/forms of content. For example, in addition to a recipient user viewing a message, the actions/operations of Process 400 can be triggered upon a user viewing an article on a web page. Thus, in this example, the provider of the web page and/or source of the article can function in the same capacity as the sender, and the bot information can be included within and/or associated with the web page, in a similar manner as discussed above.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving, by a server, a message addressed to an inbox of a recipient and sent from a sender, the message comprising content and information related to a bot application, the bot application information indicating a type of action set by the sender that is to be performed at the inbox, the bot application information further comprising timing information indicating a timing of when to perform an action of the indicated type;

analyzing, by the server, prior to delivery of the message to the inbox, the message and identifying the bot application information, the analysis further comprising determining the type of action and the timing for performing the action of the indicated type of action based on the identified bot application information;

delivering, by the server, the message to the inbox;

determining, by the server, to perform the action based on the timing determination; and causing, by the server, the action to be automatically executed in accordance with the determination to perform the action, the executed action causing a user interface (UI) associated with the inbox to be modified according to the type of action.

2. The method of claim 1, wherein the bot application information comprises at least one of a Uniform Resource Locator (URL) associated with a network location, a resource identifier (ID) associated with a database of alternate content, and instructions for sharing the message with a set of contacts of the recipient.

3. The method of claim 2, further comprising:
when the bot information comprises a URL, accessing, by the server, the network location associated with the URL;
retrieving, by the server, supplemental content from the network location; and
causing, by the server, the supplemental content to be displayed in association with the message within the modified UI.

4. The method of claim 2, further comprising:
when the bot information comprises the resource ID, retrieving, by the server from the database, based on the resource ID, alternate content; and
causing, by the server, the alternate content to be displayed in association with the message within the modified UI.

5. The method of claim 4, further comprising accessing, by the server, alternate content that has been uploaded to the database by the sender.

6. The method of claim 2, further comprising:
analyzing, by the server, contact information of the recipient to determine the set of contacts; and
enabling, by the server, the recipient to share the message with each contact in the set of contacts via the modified UI.

7. The method of claim 6, wherein the determination of the set of contacts is based at least in part on a context of the message content and interests of each contact in the set of contacts.

8. The method of claim 1,
the determined timing relating to at least one of an opening of the message and delivery of the message to the inbox.

9. The method of claim 1, wherein the bot application information is included within a portion of the message.

10. The method of claim 1, wherein the bot application information relates to multiple bot applications.

11. A non-transitory computer-readable storage medium tangibly encoded with computer-executable instructions, that when executed by a processor associated with a server, performs a method comprising:
receiving, by the server, a message addressed to an inbox of a recipient and sent from a sender, the message comprising content and information related to a bot application, the bot application information indicating a type of action set by the sender that is to be performed at the inbox, the bot application information further comprising timing information indicating a timing of when to perform an action of the indicated type;

analyzing, by the server, prior to delivery of the message to the inbox, the message and identifying the bot application information, the analysis further comprising determining the type of action and the timing for performing the action of the indicated type of action based on the identified bot application information;

delivering, by the server, the message to the inbox;

determining, by the server, to perform the action based on the timing determination; and causing, by the server, the action to be automatically executed in accordance with the determination to perform the action, the executed action causing a user interface (UI) associated with the inbox to be modified according to the type of action.

12. The non-transitory computer-readable storage medium of claim 11, wherein the bot application information comprises at least one of a Uniform Resource Locator (URL) associated with a network location, a resource identifier (ID) associated with a database of alternate content, and instructions for sharing the message with a set of contacts of the recipient.

13. The non-transitory computer-readable storage medium of claim 12, further comprising:
when the bot information comprises a URL, accessing, by the server, the network location associated with the URL;
retrieving, by the server, supplemental content from the network location; and
causing, by the server, the supplemental content to be displayed in association with the message within the modified UI.

14. The non-transitory computer-readable storage medium of claim 12, further comprising:
when the bot information comprises the resource ID, retrieving, by the server from the database, based on the resource ID, alternate content; and
causing, by the server, the alternate content to be displayed in association with the message within the modified UI.

15. The non-transitory computer-readable storage medium of claim 12, further comprising:
analyzing, by the server, contact information of the recipient to determine the set of contacts; and
enabling, by the server, the recipient to share the message with each contact in the set of contacts via the modified UI.

16. A server comprising:
a processor configured to:
receive a message addressed to an inbox of a recipient and sent from a sender, the message comprising content and information related to a bot application, the bot application information indicating a type of action set by the sender that is to be performed at the inbox, the bot application information further comprising timing information indicating a timing of when to perform an action of the indicated type;

analyze, prior to delivery of the message to the inbox, the message, and identify the bot application information, the analysis further configured to determine the type of action and the timing for performing the action of the indicated type of action based on the identified bot application information;

deliver the message to the inbox;

determine to perform the action based on the timing determination; and cause the action to be automatically executed in accordance with the determination to perform the action, the executed action causes a user interface (UI) associated with the inbox to be modified according to the type of action.

17. The server of claim 16, wherein the bot application information comprises at least one of a Uniform Resource Locator (URL) associated with a network location, a resource identifier (ID) associated with a database of alternate content, and instructions for sharing the message with a set of contacts of the recipient.

18. The server of claim 17, wherein the processor is further configured to:

when the bot information comprises a URL, access the network location associated with the URL;

retrieve supplemental content from the network location; and cause the supplemental content to be displayed in association with the message within the modified UI.

19. The server of claim 17, wherein the processor is further configured to:

when the bot information comprises the resource ID, retrieve, from the database, based on the resource ID, alternate content; and cause the alternate content to be displayed in association with the message within the modified UI.

20. The server of claim 17, wherein the processor is further configured to:

analyze contact information of the recipient to determine the set of contacts; and enable the recipient to share the message with each contact in the set of contacts via the modified UI.

* * * * *